United States Patent Office 2,980,664
Patented Apr. 18, 1961

2,980,664

POLYMERIZATION OF OLEFINS

Archibald P. Stuart, Media, Pa., assignor to Sun Oil Company, Philadelphia, Pa., a corporation of New Jersey No Drawing. Filed May 6, 1959, Ser. No. 811,255

15 Claims. (Cl. 260—93.7)

This invention relates to the polymerization of olefins, and more particularly relates to the polymerization of normally gaseous alpha-olefins to high molecular weight solid polymers.

This application is a continuation-in-part of my copending application Serial No. 724,895, filed March 31, 1958, now abandoned.

Catalytic systems effective for the homopolymerization of normally gaseous alpha-olefins such as ethylene, propylene, and butene-1 to solid polymers under relatively low temperature and pressure conditions have heretofore been described. One such catalyst system is prepared by reacting titanium tetrachloride with an aluminum alkyl dichloride, followed by activation with an aluminum trialkyl. A disadvantage of this catalyst system, however, is that there is also produced during the polymerization considerable quantities of non-crystalline and atactic polymer. Presence of these types of polymer in the finished crystalline polymer is very undesirable, since tensile strength is greatly lowered by their presence. It is therefore necessary to remove them before the polymer is to be further processed into films or fibers. This is customarily done by extracting the polymer first with boiling pentane to remove the non-crystalline polymer and then with boiling heptane to remove the atactic polymer, which is believed to be a block polymer having alternate crystalline and non-crystalline segments. Normally from 20% to 30% of the polymer is removed by these extractions. The non-crystalline and atactic polymers have no known uses, so that any method for reducing the formation of these polymers during the course of the polymerization reaction is of great economic importance.

It is an object of this invention to provide a novel catalyst system for polymerizing olefins to high molecular weight crystalline polymers without concomitant formation of substantial quantities of non-crystalline and atactic polymers. A further object is to provide a process for the polymerization of normally gaseous alpha olefins to high molecular weight crystalline polymers.

I have now found that if the titanium tetrachloride-aluminum alkyl dichloride-aluminum trialkyl system is modified by mixing with the titanium tetrachloride from about 1 to about 15 mol percent of an anhydrous halide of a group 1B metal prior to reaction with the aluminum alkyl dichloride, the polymerization proceeds in a manner such that the pentane and heptane soluble polymer may be reduced to as low as 5% of the total polymer. Among the group 1B metal halides suitable for use in preparation of my novel catalyst system are cuprous chloride, cupric chloride, silver chloride, gold chloride and the corresponding bromides and iodides. Of these cupric chloride is preferred. The reason why the present catalytic system is remarkably effective in reducing the production of non-crystalline and atactic polymer is not known, but it is believed that the compound may enter into the crystal lattice of the precipitate obtained on reacting titanium tetrachloride with an aluminum alkyl dichloride, which precipitate is believed to be a titanium alkyl trichloride, in a manner to alter the crystal structure, and to thereby improve its catalytic habits.

The new catalyst system must be prepared in an atmosphere free of oxygen, water or other polar compounds such as alcohol, since these compounds deactivate the catalyst. In preparing the catalyst titanium tetrachloride and the 1B metal halide are mixed either in the presence of an inert solvent or in the absence thereof. If mixed in the absence of a solvent, the aluminum alkyl dichloride is mixed with solvent prior to addition to the mixture of titanium dichloride. Suitable solvents include saturated hydrocarbons such as the hexanes, heptanes, octanes, decanes, and the like, aromatic hydrocarbons such as benzene, toluene, and xylene, and chlorinated hydrocarbons. At least one molar equivalent of aluminum alkyl dichloride is then added to the mixture of titanium tetrachloride and 1B metal halide, but it is preferred to add from two to five mols in order to speed the reaction. The solvent at this stage of catalyst preparation should constitute at least 75% by weight of the mixture, since at lower concentrations the slurry formed by the reaction of the titanium tetrachloride and aluminum alkyl dichloride becomes difficult to handle. More dilute solutions of the reagents may be used, but this increases the time required for the reaction to go to completion.

After the reaction between the titanium tetrachloride and the aluminum alkyl dichloride has gone to completion, a solution of aluminum trialkyl in an inert solvent is added, and the catalyst mixture is charged to a pressure vessel. From one to ten mols of aluminum trialkyl should be added per mol of titanium tetrachloride, preferably from two to five. The amount of solvent present should be such as to yield a concentration of catalyst, based on titanium tetrachloride, of from 0.01 to 1.0 grams per 100 cc.

Monomer is now charged to the pressure vessel equipped with stirring means, preferably under a pressure such that the solvent will contain from 20 to 75 percent monomer in solution. However, the monomer may be simply bubbled through the suspension of catalyst in solvent. Polymerization will commence immediately, and additional monomer should be continuously added to maintain the concentration of monomer in the solution at the desired value. The temperature during the polymerization should be held between 60° F. and 130° F., since at lower temperatures the reaction is undesirably slow, and at higher temperatures the 1B metal chloride is ineffective to reduce the amount of pentane and heptane soluble polymer produced. Preferably the temperature is maintained at about 90° F. After the catalyst has become so coated with polymer that the reaction has, for all practical purposes, ceased, the reactor is opened to vent unreacted monomer, and alcohol is then added to deactivate the catalyst. The polymer is then recovered from the solvent by filtration or centrifuging.

In order that those skilled in the art may more fully understand the nature of my invention and the method of carrying it out, the following examples are given.

EXAMPLE 1

Under substantially anhydrous and oxygen-free conditions, 0.09 gram of cupric chloride in pulverized form was contacted with 2.6 grams of liquid titanium tetrachloride, the quantity of cupric chloride being about 5 mole percent of the titanium tetrachloride, and the system was allowed to stand about 16 hours. A quantity of n-heptane, about 12 cc., was added to dissolve the titanium tetrachloride, and a quantity of ethyl aluminum dichloride was added to reduce the tetrachloride. The mole ratio of ethyl aluminum dichloride to titanium tetrachloride plus cupric chloride was 3.6. On adding the ethyl aluminum dichloride a solid precipitate formed which was allowed to stand 30 minutes. To the resulting system were added about 2640 cc. of a mixture of paraffinic hydrocarbons consisting principally of octanes, 4.66 grams of aluminum triethyl and a quantity of propylene so that the concentration thereof in the system was 55 mole percent. The temperature of the reaction mixture was maintained from 33° C. to 35° C. for 1.28 hours. Methanol was then added to kill the catalytic activity and, after filtering, the polymer product was comminuted in the presence of methanol. After separation of methanol and methanol soluble materials, the polymer was extracted with n-pentane, extracted with n-heptane, and dried in an oven at from 90° C. to 95° C. for 2 hours. The rate of production of solid polymer was 0.15 pounds per gallon of reactor capacity per hour. The molecular weight was 436,000. Three percent of the product was pentane-soluble and an additional 2% was heptane-soluble. Thus, 95% of the polymers produced were isotactic.

Repeating the above procedure, except omitting the cupric chloride results in a similar product which, however, contains 17.6% of materials soluble in n-pentane and 4 parts of material soluble in n-heptane. Thus, only 78.4% of the polymers produced were isotactic.

In order to determine the effect of the concentration of cupric chloride and the effect of temperature on the reaction, a number of other runs were made using catalysts prepared according to the method given in Example 1. Results of these runs are set forth in the following table.

Table I

[System: $TiCl_4$ (1.0 mol) $CuCl_2$—$AlEtCl_2$ (3.6 mol)—$AlEt_3$ (3.0 mol), propylene 55 mol percent]

| Mol percent $CuCl_2$ | Temp., °F. | $TiCl_4$+ $CuCl_2$, g./ 100 cc. | Total Product | | Mol Wt. ×10⁻³ |
|---|---|---|---|---|---|
| | | | Percent $C_5$ sol. | Percent $C_7$ sol. | |
| 0 | 90 | 0.097 | 16 | 21 | 443 |
| 2.5 | 90 | 0.097 | 5 | 8 | 513 |
| 5.0 | 90 | 0.097 | 4 | 7 | 380 |
| 10.0 | 90 | 0.097 | 7 | 9 | 464 |
| 0 | 120 | 0.05 | 16 | 19 | 254 |
| 5.0 | 120 | 0.05 | 12 | 14 | 345 |
| 0 | 160 | 0.098 | 25 | 31 | 147 |
| 5.0 | 160 | 0.098 | 36 | 39 | 191 |

It will be observed from the foregoing that the concentration of cupric chloride in the catalyst had little effect on the amount of $C_5$ and $C_7$ solubles, but the temperature had a great effect. At 120° F. the $CuCl_2$ had only a marginal effect on the reaction, and at 160° F. the $CuCl_2$ seemed to increase the amount of these solubles. In the table "percent $C_7$ sol." includes $C_5$ solubles. Mol weight was determined by the intrinsic viscosity method.

In order to determine the effect of other metal halides on the reaction, a number of other runs using various metal chlorides were made. Results of these runs are summarized in the following table.

Table II

[System: $TiCl_4$ (0.95 mol)—metal salts (0.05 mol)—$AlEtCl_2$ (3.6 mols)—$AlEt_3$ (3.0 mols); temperature 90°F.; $TiCl_4$+metal halide, g./100 cc.=.097]

| Mol percent $C_3$= | Metal Halide | Total Product | | Mol wt. ×10⁻³ |
|---|---|---|---|---|
| | | Percent $C_5$ sol. | Percent $C_7$ sol. | |
| 75 | none | 15.2 | 17.8 | 310 |
| 75 | $SnCl_4$ | 41.0 | 44.6 | 96 |
| 75 | $VCl_2$ | 22.4 | 27.1 | 341 |
| 75 | $MoCl_5$ | 17.0 | 20.2 | 328 |
| 55 | none | 17.6 | 21.6 | 443 |
| 55 | $CuCl_2$ | 4.1 | 7.0 | 380 |
| 55 | $CuCl$ | 8.0 | 11.0 | 350 |
| 55 | $AgCl$ | 10.0 | 13.0 | 464 |
| 55 | $CrCl_2$ | 18.0 | 21.0 | 506 |
| 55 | $CoCl_2$ | 21.0 | 24.0 | 331 |
| 55 | $OsCl_3$ | 60.0 | 66.0 | |

As may be seen from the foregoing, only the chlorides of the metals of group 1B were effective in reducing the amount of $C_5$ and $C_7$ soluble polymers formed in the reaction. Chlorides of metals of other groups in the periodic table either had no appreciable effect on the reaction, or increased the amount of $C_5$ and $C_7$ solubles, markedly so in the case of tin chloride and osmium chloride.

While in the foregoing examples aluminum ethyl dichloride was used to react with the titanium tetrachloride, and aluminum triethyl was used as the activator, other alkyl dichlorides or trialkyls may be used with equivalent results. For example, aluminum propyl dichloride or aluminum isobutyl dichloride may be used to react with the titanium tetrachloride, and aluminum trimethyl, aluminum tripropyl, or aluminum triisobutyl may be used as the activator. Aluminum dialkyl chlorides may not be substituted for the aluminum alkyl dichloride.

Also, while in all the foregoing examples propylene was used to obtain valid comparative data, the same reduction in $C_5$ and $C_7$ soluble polymers is noted when polymerizing ethylene and butene-1.

While the chlorides of the group 1B metals are preferred because of their ready availability and relative cheapness, the bromides and iodides have a similar action in reducing $C_5$ and $C_7$ solubles.

The invention claimed is:

1. A process for the polymerization of olefins which comprises contacting an olefin selected from the group consisting of ethylene, propylene, and butene-1 with a catalytic system consisting essentially of one prepared by mixing titanium tetrachloride with about 1 to about 15 mol percent based on said titanium tetrachloride of an anhydrous halide of a metal of group IB of the periodic table wherein said halide is selected from the group consisting of a chloride, an iodide and a bromide, reacting the mixture with at least one mol of an aluminum alkyl dichloride, in the presence of an inert solvent, allowing the reaction between the titanium tetrachloride and the aluminum alkyl dichloride to go to substantial completion, and adding to the reaction mixture at least one mol of an aluminum trialkyl per mol of titanium tetrachloride, said polymerization being carried out at a temperature between 60° F. and 130° F.

2. A process for polymerizing propylene which comprises contacting propylene with a catalyst system consisting essentially of one prepared by mixing titanium tetrachloride with about 1 to about 15 mol percent of an anhydrous halide of a metal of group IB of the periodic table wherein said halide is selected from the group consisting of a chloride, an iodide, and a bromide, reacting the resulting mixture with at least 1 mol of an aluminum alkyl dichloride in the presence of an inert solvent, allowing the reaction between said titanium compound and said aluminum compound to go to substantial completion, and adding to the resulting reaction mixture at least 1 mol of an aluminum trialkyl per mol of titanium tetrachloride, said polymerization being carried out at a temperature between about 60° F. and about 130° F.

3. A process according to claim 2 wherein said halide is cupric chloride.

4. The process according to claim 3 in which the aluminum alkyl dichloride is aluminum ethyl dichloride and the aluminum trialkyl is aluminum triethyl.

5. The process of claim 2 wherein said halide is cuprous chloride.

6. The process according to claim 5 in which the aluminum alkyl dichloride is aluminum ethyl dichloride and the aluminum trialkyl is aluminum triethyl.

7. The process according to claim 2 wherein the halide is a silver chloride.

8. The process according to claim 7 in which the aluminum alkyl dichloride is aluminum ethyl dichloride and the aluminum trialkyl is aluminum triethyl.

9. A new catalytic system effective for polymerizing olefins consisting essentially of one prepared by mixing titanium tetrachloride with about 1 to 15 mol percent of an anhydrous halide of a metal of group IB of the periodic table wherein said halide is selected from the group consisting of a chloride, an iodide and a bromide, reacting the mixture with at least one mol of an aluminum alkyl dichloride in the presence of an inert solvent, until the reaction goes to substantial completion, and adding to the reaction mixture at least one mol of an aluminum trialkyl per mol of titanium tetrachloride, all of the foregoing steps being carried out in the absence of oxygen and moisture.

10. The catalytic system according to claim 9 wherein said metal halide is cupric chloride.

11. The catalytic system according to claim 10 wherein said aluminum alkyl dichloride is aluminum ethyl dichloride and said aluminum trialkyl is aluminum triethyl.

12. The catalytic system according to claim 9 wherein said metal halide is cuprous chloride.

13. The catalytic system according to claim 12 wherein said aluminum alkyl dichloride is aluminum ethyl dichloride and said aluminum trialkyl is aluminum triethyl.

14. The catalytic system according to claim 9 wherein said metal halide is silver chloride.

15. The catalytic system according to claim 14 wherein said aluminum alkyl dichloride is aluminum ethyl dichloride and said aluminum trialkyl is aluminum triethyl.

References Cited in the file of this patent
UNITED STATES PATENTS 2,888,448    Gresham et al. _____ May 26, 1959

FOREIGN PATENTS 789,781    Great Britain _____ Jan. 29, 1958